US010833608B2

(12) United States Patent
Shinzato et al.

(10) Patent No.: US 10,833,608 B2
(45) Date of Patent: Nov. 10, 2020

(54) VIBRATION ACTUATOR AND ELECTRONIC APPARATUS USING VIBRATION ACTUATOR

(71) Applicant: CANON KABUSHIKI KAISHA, Tokyo (JP)

(72) Inventors: Yuki Shinzato, Tokyo (JP); Kei Suefuji, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 379 days.

(21) Appl. No.: 15/658,853

(22) Filed: Jul. 25, 2017

(65) Prior Publication Data

US 2018/0041141 A1 Feb. 8, 2018

(30) Foreign Application Priority Data

Aug. 3, 2016 (JP) .................................. 2016-152806
Jul. 6, 2017 (JP) .................................. 2017-132935

(51) Int. Cl.
*H02N 2/00* (2006.01)

(52) U.S. Cl.
CPC .................................. *H02N 2/0015* (2013.01)

(58) Field of Classification Search
CPC ...... H02N 2/0015; H02N 2/001; H02N 2/004; H02N 2/005; H02N 2/02; H02N 2/04
USPC ........................................ 310/323.01–323.21
See application file for complete search history.

(56) References Cited

U.S. PATENT DOCUMENTS

| 7,969,065 | B2 | 6/2011 | Seki et al. | |
|---|---|---|---|---|
| 8,339,016 | B2 | 12/2012 | Seki et al. | |
| 2005/0184621 | A1* | 8/2005 | Kitahara | G04C 13/12 310/311 |
| 2010/0237743 | A1* | 9/2010 | Adachi | H01L 41/0471 310/323.02 |
| 2011/0278987 | A1* | 11/2011 | Oda | H02N 2/0015 310/323.16 |
| 2013/0334927 | A1* | 12/2013 | Fujimoto | H02N 2/0085 310/314 |

FOREIGN PATENT DOCUMENTS

JP 09-233868 A 9/1997
JP 5473279 B2 4/2014

* cited by examiner

*Primary Examiner* — Derek J Rosenau
(74) *Attorney, Agent, or Firm* — Venable LLP

(57) ABSTRACT

A vibration actuator, which is capable of being miniaturized or obtaining stable drive performance, moves a vibration body and a contact body relatively. The vibration actuator includes a support member that supports the vibration body. The support member includes a vibration section joined to the vibration body, a first fixing section and a second fixing section that are provided on opposite sides of the vibration body for fixing the support member at a predetermined position, a first support section that connects the vibration section with the first fixing section to support the vibration body, a second support section that connects the vibration section with the second fixing section to support the vibration body, and conduction members that extend from the vibration body to the first fixing section, extend from the vibration body to the second fixing section, and supply electric power to the vibration body.

20 Claims, 10 Drawing Sheets

FIRST BENDING VIBRATION MODE

SECOND BENDING VIBRATION MODE

THIRD BENDING VIBRATION MODE

FOURTH BENDING VIBRATION MODE

VIBRATION ACTUATOR AND ELECTRONIC APPARATUS USING VIBRATION ACTUATOR

BACKGROUND OF THE INVENTION

Field of the Invention

The present invention relates to a vibration actuator and an electronic apparatus using this, and particularly, relates to a configuration that supplies electric power to a vibration body constituting the vibration actuator and that supports the vibration body.

Description of the Related Art

There is a known vibration actuator that brings a driven body into press contact with a vibration body that is constituted by joining a piezoelectric device and an elastic body. Such a vibration actuator excites vibration in the vibration body by applying alternating voltage to the piezoelectric device and relatively moves the vibration body and driven body by giving a friction driving force caused by the vibration. As a method of supporting a vibration body for miniaturizing a vibration actuator, a method of using a support member that has both a power supplying function and a support function for a vibration body is proposed in Japanese Patent No. 5473279 (JP 5473279B) and Japanese Laid-Open Patent Publication (Kokai) No. H9-233868 (JP H9-233868A).

FIG. 12 is a perspective view schematically showing a configuration of a vibration actuator 900 described in JP 5473279B. In the vibration actuator 900, a flexible printed circuit board (hereinafter referred to as "FPC") 902 that supplies power to a vibration body 901 plays a role of the support member by fixing the FPC 902 to a housing member 903. The FPC 902 consists of a fixing part 902c fixed to the housing member 903, a vibration part 902a joined to the vibration body 901, and a support part 902b that connects the fixing part 902c to the vibration part 902a.

A driven body 904 that comes into press contact with the vibration body 901 is driven in an X-axis direction shown in FIG. 12. In the vibration actuator 900, when required driving force decreases with miniaturization, pressure force in a Z-axis direction that brings the vibration body 901 into press contact with the driven body 904 decreases, and accordingly, rigidity required for the support part 902b also decreases. Moreover, a spring constant in response to the pressure force required between the vibration body 901 and the driven body 904 is enlarged by shortening an overhang distance (the length of the support part 902b in a Y-axis direction) from the vibration part 902a to the fixing part 902c of the FPC 902. Accordingly, the FPC 902 of which the rigidity is smaller than that of a metallic member is able to function as the support member for the vibration body 901.

When the vibration body 901 is supported by the FPC 902, it becomes unnecessary to provide a member that supports the vibration body 901 in addition to the FPC 902, which reduces the number of components constituting the vibration actuator 900. Moreover, since the rigidity in the Z-axis direction and the rigidity around a Y-axis of the support part 902b of the FPC 902 are low enough, a contact surface of the vibration body 901 follows a contact surface of the driven body 904, which reduces unevenness of pressure on these contact surfaces. On the other hand, the support part 902b is required to have sufficient intensity for receiving reaction force from the driven body 904 at the time of driving. The requirement is satisfied by conduction members 902d that form wirings of the FPC 902. Since the conduction members 902d have sufficient intensity, a reinforcement function by the conduction members 902d increases the intensity in directions in an XY-plane, which enables the FPC 902 to receive the reaction force at the time of driving. This reduces degradation of the responsiveness at the time of driving of the vibration actuator.

FIG. 13 is a plan view showing a support mechanism of a vibration body 930 that constitutes another vibration actuator described in JP 5473279B. An FPC 932 attached to the vibration body 930 is joined to a pair of housing parts 933 that are arranged so as to face each other across the vibration body 930 in a Y-axis direction shown in FIG. 13. Accordingly, the support of the vibration body 930 is more stable than that of the vibration body 901 of the vibration actuator 900 shown in FIG. 12.

FIG. 14 is a plan view showing a support mechanism of a vibration body 950 that constitutes a vibration actuator described in JP 5473279B. An extending direction of conduction members 952d of an FPC 952 is parallel to a direction that connects two fixing parts 952c that are fixed to a housing (not shown). The two fixing parts 952c are arranged so as to sandwich the vibration body 950 (junction of the vibration body 950 and the FPC 952). Such a configuration enables to support the vibration body 950 stably, and to attain the miniaturizations of the vibration body 950 including the configuration of the housing (not shown).

However, when the vibration body 901 shown in FIG. 12 is further miniaturized, a secondary section moment of the vibration body 901 becomes small. Accordingly, the effect of the conduction members 902d on a mode shape and resonance frequency becomes large because the rigidity of the vibration body 901 becomes small and the rigidity of the conduction members 902d (copper foil) of the FPC 902 becomes relatively close to the rigidity of the vibration body 901. That is, since vibrational state of the vibration body 901 may be changed by the conduction members 902d of which the rigidity becomes close to the rigidity of the vibration body 901, a new problem that a desired mode shape and resonance frequency are not obtained may occur.

Since the extending direction of the conduction members 902d from the vibration body 901 is one direction (+Y axis direction), symmetry of variation displacement excited in the vibration body 901 collapses, which may change the resonance frequency largely. Moreover, since the fixing part 902c that supports the vibration body 901 is configured as a cantilever, the posture of the vibration body 901 may not be stabilizable. As a result, the posture of the vibration body 901 varies easily at the time when the driven body 904 is pressed and at the time of driving when reaction force occurs. In association with this, the vibrational state of the vibration body 901 may become unstable because a motion and distortion occur in the FPC 902.

The vibration body 930 shown in FIG. 13 ensures the stabilized posture of the vibration body 930 by supporting force obtained by restricting the FPC 932 with the two housing parts 933 arranged symmetrically. However, since the extending direction of the conduction members 932d formed on the FPC 932 is one direction (−X axis direction), when the vibration body 930 is further miniaturized, symmetry of the variation displacement excited in the vibration body 930 collapses, which may change the resonance frequency. Moreover, a section of the FPC 932 between the junction with the vibration body 930 and the connector 934 connected with a power supply circuit (not shown) is not fixed. Accordingly, when states of the conduction members 932d vary according to arrangements of wirings in this section, the vibrational state of the vibration body 930 may become unstable.

In the vibration body 950 shown in FIG. 14, since one of the fixing parts 952c is provided in the course of extension of the conduction members 952d, the posture of the vibration body 950 tends to be stabilized. However, since the conduction members 952d extend in only one direction from the center of the junction of the vibration body 950 and FPC 952 toward one of the fixing parts 952c, the desired mode shape may not be obtained, when the further miniaturization is attained like the vibration body 901.

As mentioned above, when the miniaturized vibration body cannot obtain the desired vibration state and becomes unstable, the driving performance of the driven body of the vibration actuator is lowered and the driving may become unstable. Moreover, since the FPCs shown in FIG. 12, FIG. 13, and FIG. 14 are extended in the driving direction of the vibration body, the vibration actuators shown in FIG. 12, FIG. 13, and FIG. 14 may increase in size.

SUMMARY OF THE INVENTION

The present invention provides a small vibration actuator or a vibration actuator that obtains stable drive performance.

Accordingly, a first aspect of the present invention provides a vibration actuator moving a vibration body and a driven body relatively, the vibration actuator including a support member that supports the vibration body, the support member including a vibration section joined to the vibration body, a first fixing section and a second fixing section that are provided on both sides of the vibration body for fixing the support member at a predetermined position, a first support section that connects the vibration section with the first fixing section to support the vibration body, a second support section that connects the vibration section with the second fixing section to support the vibration body, and conduction members that extend from the vibration body to the first fixing section, extend from the vibration body to the second fixing section, and supply electric power to the vibration body.

Accordingly, a second aspect of the present invention provides a vibration actuator moving a vibration body and a driven body relatively, the vibration actuator including a support member that supports the vibration body, the support member including a vibration section joined to the vibration body, a first fixing section and a second fixing section that are provided on both sides of the vibration body for fixing the support member at a predetermined position, a first support section that connects the vibration section with the first fixing section to support the vibration body, and a second support section that connects the vibration section with the second fixing section to support the vibration body. The vibration body and the driven body move relatively in a direction along which the first fixing section, the first support section, the vibration section, the second support section, and the second fixing section line up.

Accordingly, a third aspect of the present invention provides an electrical apparatus including the vibration actuator of the first aspect, and a member that is moved by the vibration actuator.

According to the present invention, a small vibration actuator or a vibration actuator that obtains stable drive performance is attained.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1A:
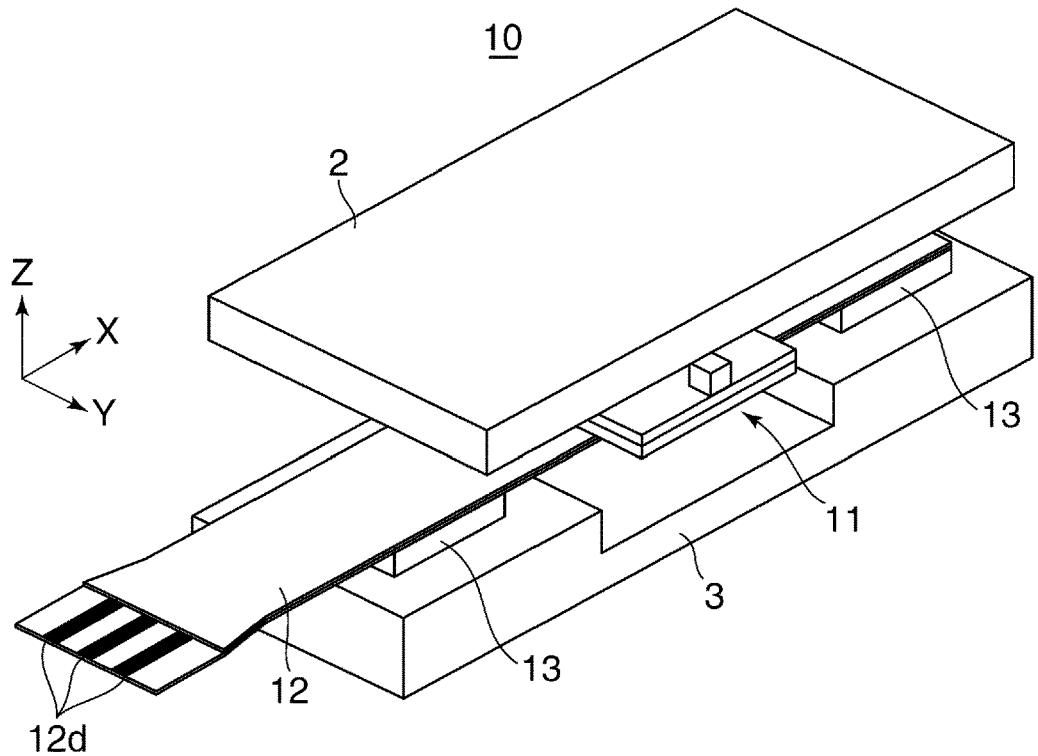
FIG. 1A is a perspective view schematically showing a configuration of a vibration actuator according to a first embodiment of the present invention.
Figure 1B:
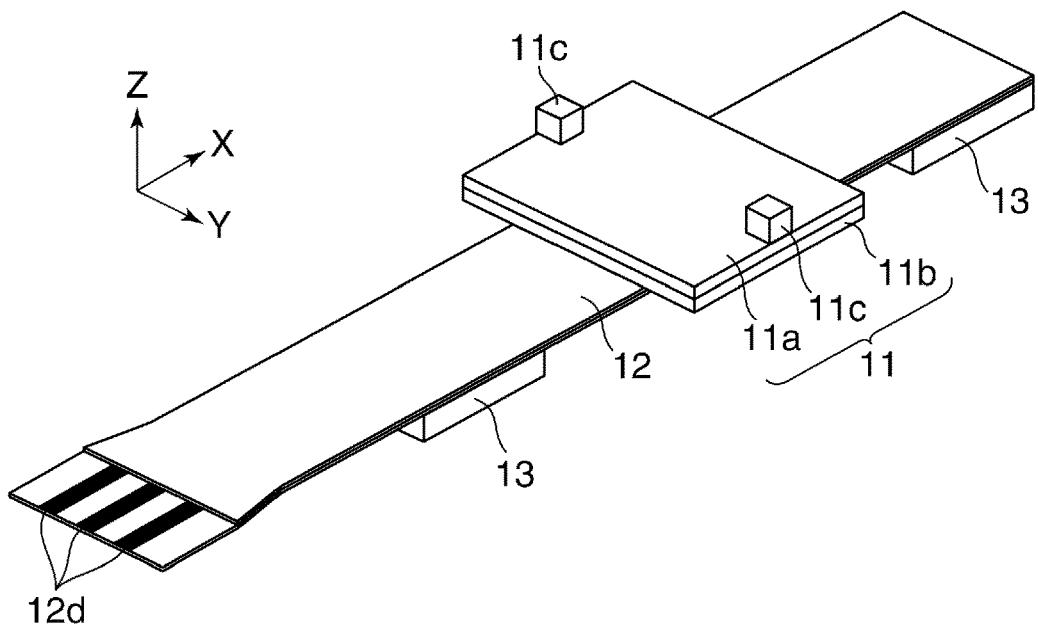
FIG. 1B is a perspective view schematically showing a configuration of a vibration body constituting the vibration actuator shown in FIG. 1A.

A first embodiment of the present invention will be described first. FIG. 1A is a perspective view schematically showing a configuration of a vibration actuator 10 according to the first embodiment of the present invention. FIG. 1B is a perspective view schematically showing a configuration of a vibration body 11 constituting the vibration actuator 10. The vibration actuator 10 has a driven (contact) body 2, the vibration body 11, an FPC (a flexible printed circuit board) 12, and backing members (reinforcement members) 13. The vibration body 11 has an elastic body 11a, a piezoelectric device 11b, and a pair of projections 11c. An X-axis, a Y-axis, and a Z-axis that intersect perpendicularly with one another are defined for convenience of description as shown in FIG. 1. A Y-axis direction is a direction that connects the two projections 11c. A Z-axis direction is a projecting direction of the projections 11c and is a thickness direction of the elastic body 11a and piezoelectric device 11b. An X-axis direction intersects perpendicularly with both the Y-axis direction and Z-axis direction. The driven body 2 and vibration body 11 move relatively in the X-axis direction when the driven body 2 is frictionally driven by the vibration body 11.

The FPC 12 as a power feed member that supplies electric power to the piezoelectric device 11b is configured by sandwiching conduction members 12d in a base member that is a two-layer sheet-shaped member in the Z-axis direction. For example, the base member is made from resin material, such as sheet-shaped polyimide film. The conduction members 12d are made from metal material, such as copper foil. The backing members 13 are fixed to one side of the FPC 12 at two positions in the X-axis direction at a predetermined gap. Moreover, the vibration body 11 is fixed to the other side of the FPC 12 so as to be located at the center between positions at which the two backing members 13 are fixed in the X-axis direction. It should be noted that "located in the center" means that distances from the vibration body 11 to the two backing members 13 in the X-axis direction are regarded as approximately identical. Specifically, the distances may differ unless causing a state shown in a graph in FIG. 6B mentioned later. The vibration body 11 is supported by a base 3 by fixing the FPC 12 to the base 3 through the backing members 13. The base 3 is a component constituting a housing etc. of an electronic apparatus (not shown) on which the vibration actuator 10 is mounted. Thus, the FPC 12 of the vibration actuator 10 has a function for supporting the vibration body 11 in addition to a function for supplying electric power to the piezoelectric device 11b. Accordingly, since another component for supporting the vibration body 11 is unnecessary, the number of components and assembly man-hours can be reduced. It should be noted that a method for fixing the FPC 12 to the base 3 through the backing members 13 is not limited. A well-known method, such as fixing with adhesive, pinching with a pressure plate, bolted-on, or caulking, may be used.

The rectangular, tabular elastic body 11a is made from metal material like SUS420J2 that is martensitic stainless steel, for example. It should be noted that "rectangular" does not mean a strict rectangle, but means that it can be approximately regarded as a rectangle. Specifically, the elastic body 11a may not be rectangular unless causing the state shown in the graph in FIG. 6B mentioned later. For example, the shape of the elastic body 11a may include part tolerance, assembling error, etc., and may be chamfered. The same interpretation is applied to the shape of the piezoelectric device etc. mentioned later. The piezoelectric device 11b that is an electro-mechanical energy conversion element is joined to one side of the elastic body 11a. The FPC 12 is joined to the piezoelectric device 11b at the side opposite to the side to which the elastic body 11a is joined. The vibration body 11 is supported by the FPC 12 in this way.

The two projections 11c are provided on the elastic body 11a at the side opposite to the side to which the piezoelectric device 11b is joined with a predetermined gap in the Y-axis direction. The projections 11c are projected in the Z-axis direction so as not to approach the piezoelectric device 11b. Although front ends of the projections 11c come into press contact with the driven body 2, FIG. 1A shows a state where the driven body 2 is separated from the projections 11c for convenience in order to show at least a part of the vibration body 11. In order to bring the projections 11c into press contact with the driven body 2, elastic force may be applied from the driven body 2 to the projection 11c or elastic force may be applied from the FPC 12 to the driven body 2 through the vibration body 11. Moreover, the projections 11c may come into press contact with the driven body 2 by making the elastic body 11a and driven body 2 become drawn mutually by magnetic force generated by a magnetic circuit formed between the driven body 2 and elastic body 11a.

It is preferable to provide a contact portion that has a desired friction coefficient and is excellent in wear resistance on the front end of each of the projections 11c. For example, the contact portion that has the desired friction coefficient and wear resistance can be formed by applying heat treating and surface polish to the front end after forming the projections 11c integrally with the elastic body 11a by bending. It should be noted that a method of forming the projections 11c is not limited. For example, the projections 11c may be formed by an etching process or plating process, or the projections 11c may be fixed to the elastic body 11a by welding members prepared as separate members from the elastic body 11a. When the elastic body 11a, projections 11c, and contact portions are formed integrally, the assembly man-hours can be reduced as compared with the case where these components are formed separately and are joined, and dispersion between components can be reduced because the positioning of the projections 11c becomes unnecessary.

The vibration actuator 10 generates elliptic movements that are drawn in the same direction in an ZX plane at the front ends (contact portions) of the projections 11c by exciting vibrations in two bending vibration modes with predetermined phase difference in the vibration body 11, which frictionally drives the driven body 2 by the projections 11c. The higher resonance frequency among the resonance frequencies of the two bending vibration modes is represented by "fa", and the difference between the resonance frequencies of the two bending vibration modes is represented by "Δf". In this case, the shape of the vibration body 11 is determined so that the resonance frequency difference Δf will become a desired value by approximating the resonance frequencies in the two bending vibration modes. Specifically, the resonance frequency difference Δf between the two bending vibration modes is approximated to the desired value by setting sizes of the vibration body 11 in a longitudinal direction (Y-axis direction), a short-side direction (X-axis direction), and a thickness direction (Z-axis direction). In this embodiment, the shape of the vibration body 11 is formed so that the resonance frequency difference Δf satisfies the following condition.

$$0 < \Delta f \leq fa \cdot 0.15$$

In this case, the thickness of the elastic body 11a is set within a range of 0.05 through 0.5 mm, and the thickness of the piezoelectric device 11b is set within a range of 0.05 through 0.5 mm. Specifically, the thicknesses of the elastic body 11a and the piezoelectric device 11b are set to 0.2 mm in this embodiment. Moreover, the resonance frequency "fa" is set to a value larger than 150 kHz. However, the size of the vibration body 11 and the resonance frequency "fa" are not confined because they are depended on the actuator shape which is designed for the application.

Figure 2A:
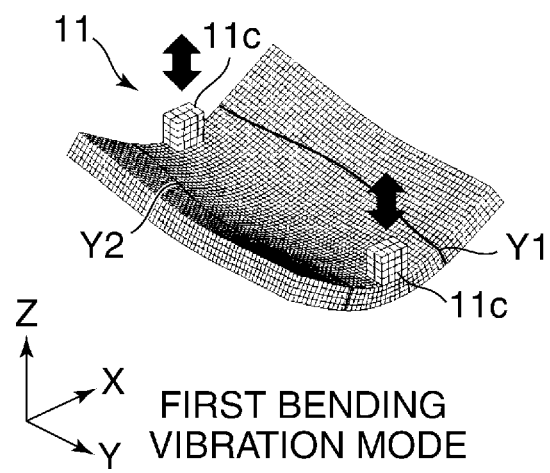
FIG. 2A and FIG. 2B are perspective views describing two bending vibration modes excited in a vibration body constituting the vibration actuator shown in FIG. 1A.

FIG. 2A is a perspective view describing a first bending vibration mode among two bending vibration modes excited in the vibration body 11. In the first bending vibration mode, nodal lines Y1 and Y2 appear. Since the vibration in the first bending vibration mode occurs in an out-of-plane direction (the Z-axis direction) to the XY plane of the vibration body 11, the nodal lines Y1 and Y2 indicate points at which the variation displacement in the Z-axis direction does not occur approximately in the vibration body 11. Since the two projections 11c are provided at positions of antinodes in the first bending vibration mode, vibrations that reciprocate in the Z-axis direction in the same phase occur at the front ends of the two projections 11c, when the vibration in the first bending vibration mode is excited in the vibration body 11.

Figure 2B:
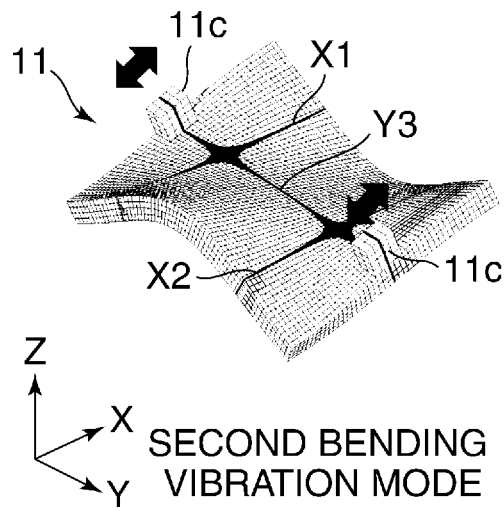

FIG. 2B is a perspective view describing a second bending vibration mode among the two bending vibration modes excited in the vibration body 11. In the second bending vibration mode, nodal lines X1, X2, and Y3 occur. Since the vibration in the second bending vibration mode also occurs in the out-of-plane direction (the Z-axis direction) to the XY plane of the vibration body 11, the nodal lines X1, X2, and Y3 indicate points at which the variation displacement in the Z-axis direction does not occur approximately in the vibration body 11. Since the two projections 11c are provided on the nodal line Y3 in the second bending vibration mode, vibrations that reciprocate in the X-axis direction in the same phase occur at the front ends of the two projections 11c, when the vibration in the second bending vibration mode is excited in the vibration body 11.

Figure 2C:
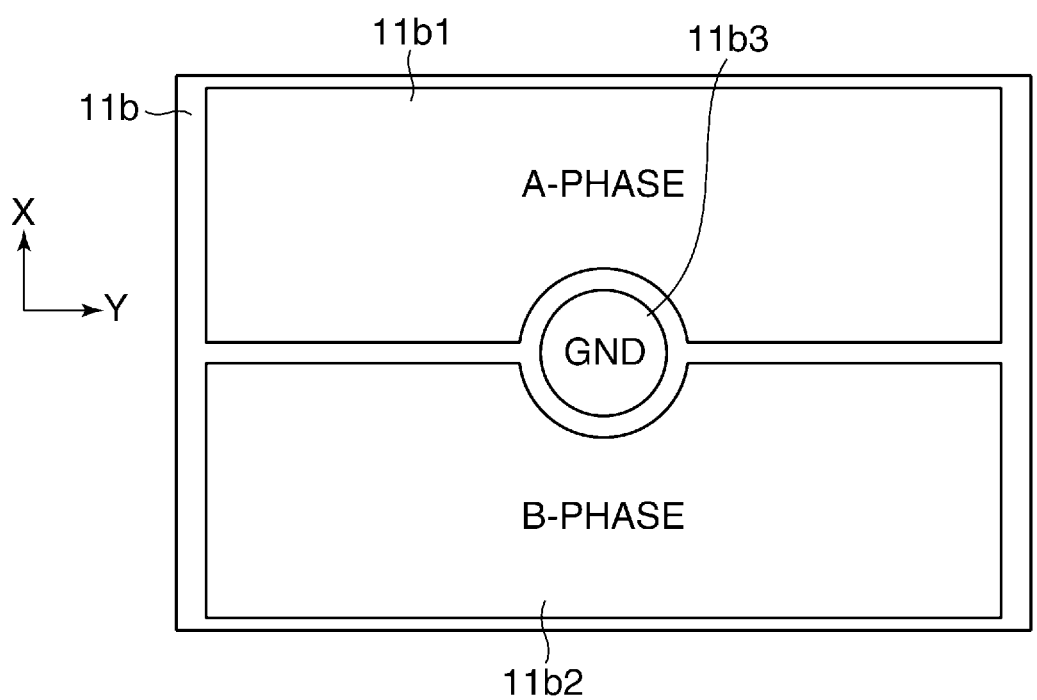
FIG. 2C is a plan view showing an electrode pattern formed on a joined surface of the piezoelectric device constituting the vibration actuator shown in FIG. 1A joined to an FPC (a flexible printed circuit board).

FIG. 2C is a plan view showing an electrode pattern formed on a joined surface of the piezoelectric device 11b joined to the FPC 12. The piezoelectric device 11b is made by forming electrodes on each surface of a rectangular, tabular piezoelectric substance that is made from electro strictive ceramics etc. so that the piezoelectric substance is polarized in a predetermined direction. The piezoelectric device 11b is an example of an electro-mechanical energy conversion element.

An A-phase electrode 11b1 and B-phase electrode 11b2 are formed on the joined surface of the piezoelectric device 11b joined to the FPC 12 so as to be divided in the X-axis direction with the nodal line Y3 that occurs when the vibration in the second bending vibration mode is excited as a boundary. Moreover, a GND electrode 11b3 is formed in the center of the joined surface of the piezoelectric device 11b joined to the FPC 12. The GND electrode 11b3 is electrically connected to a common electrode (a GND electrode) that is formed on a joined surface of the piezoelectric device 11b joined to the elastic body 11a via a through hole electrode (not shown) that penetrates the piezoelectric substance in the Z-axis direction. A poling process in the same direction of the Z-axis direction is applied to the sections of the piezoelectric substance in which the A-phase electrode 11b1 and B-phase electrode 11b2 are provided. It should be noted that an electrical connection to the common electrode formed on the joined surface of the piezoelectric device 11b joined to the elastic body 11a may be taken out from the surface of the elastic body 11a. In such a case, a GND wiring 12d3 mentioned later is not provided in the conduction members 12d of the FPC 12.

A voltage value and frequency of alternating voltage V1 applied to the A-phase electrode 11b1 are identical to that of alternating voltage V2 applied to the B-phase electrode 11b2. When the alternating voltages V1 and V2 are input into the piezoelectric device 11b in the same phase under this condition, directions of expansion and contraction caused in the electrode regions of the A-phase electrode 11b1 and B-phase electrode 11b2 are identical. Accordingly, when the frequency of the alternating voltages V1 and V2 approximates the resonance frequency in the first bending vibration mode in which the electrode regions vibrate in the same expansion-and-contraction direction, the vibration in the first bending vibration mode is excited in the vibration body 11. Moreover, when the alternating voltages V1 and V2 are input into the piezoelectric device 11b in phases opposite to each other, directions of expansion and contraction caused in the electrode regions of the A-phase electrode 11b1 and B-phase electrode 11b2 are mutually opposite. Accordingly, when the frequency of the alternating voltages V1 and V2 approximates the resonance frequency in the second bending vibration mode in which the electrode regions vibrate in the opposite expansion-and-contraction directions, the vibration in the second bending vibration mode is excited in the vibration body 11.

The shape of the vibration body 11 is determined so as to approximate the resonance frequencies in the first and second bending vibration modes mutually as mentioned above. Accordingly, when the alternating voltages V1 and V2, of which frequencies are identical to that of the input voltage, are respectively applied to the A-phase electrode 11b1 and the B-phase electrode 11b2 while shifting the phases by 90 degrees, for example, the phases of the vibrations excited in the first bending vibration mode and second bending vibration mode are shifted by 90 degrees. As a result, elliptic movements in the ZX plane occur at the front ends of the projections 11c, and the driven body 2 that comes into press contact with the front ends receives friction driving force from the projections 11c. Accordingly, the vibration body 11 and driven body 2 are moved relatively in the X-axis direction. It should be noted that orbital shapes of the elliptic movements that occur at the front ends of the projections 11c are changeable by changing the voltage values of the alternating voltages V1 and V2 and the input phase difference between V1 and V2.

Figure 3A:
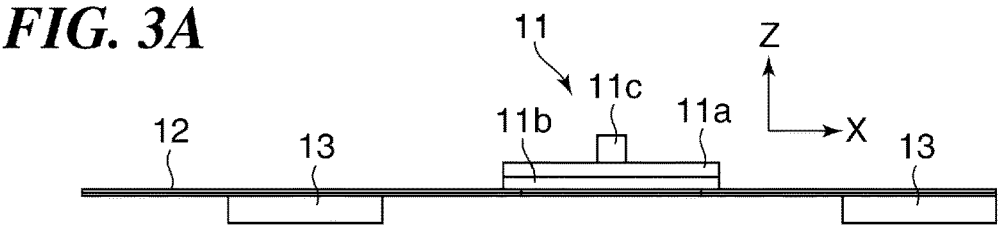
FIG. 3A and FIG. 3B are a side view and back view showing the vibration actuator shown in FIG. 1A.

FIG. 3A is a side view showing the vibration actuator 10. The driven body 2 is not shown in FIG. 3A. The two projections 11c are arranged at the positions that are rotationally symmetric about an axis that passes through the center of gravity of the vibration body 11 and is parallel to a pressurizing direction (the Z-axis direction). Accordingly, the center of gravity of the vibration body 11 is supported from the direction that is opposite to the pressurizing direction by the FPC 12. Moreover, the two backing members 13 are fixed to the FPC 12 at positions that are rotationally symmetric about the axis that passes through the center of gravity of the vibration body 11 in the Z-axis direction as with the two projections 11c. Accordingly, the center of gravity of the section of the FPC 12 between the portions at which the two backing members 13 are fixed is supported by receiving the reaction forces against the pressure force uniformly by the portions at which the two backing members 13 are fixed. Accordingly, since the center of gravity of the vibration body 11 is supported by the FPC 12 and the two backing members 13, the vibration body 11 is supported in a stabilized posture.

Figure 3B:
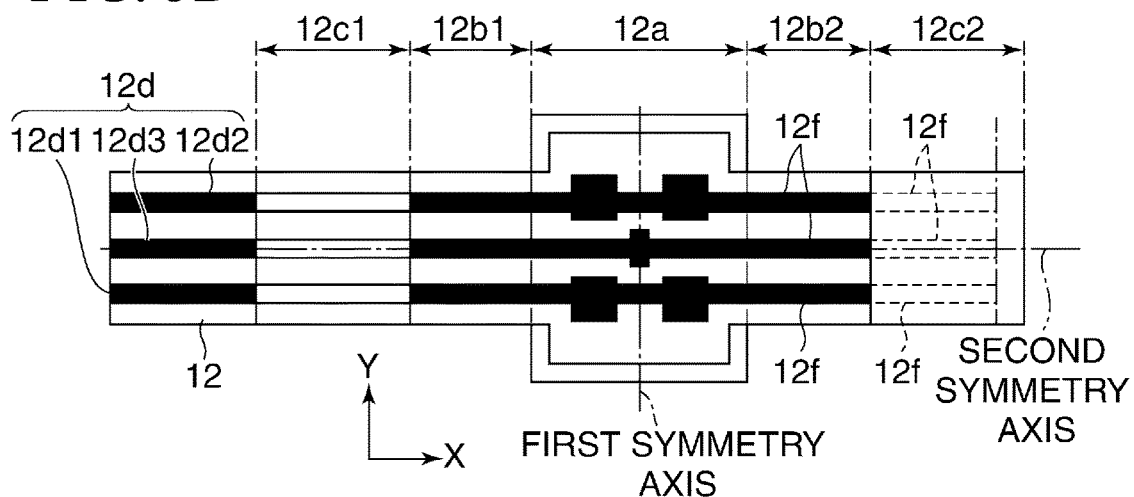

FIG. 3B is a back view showing the vibration actuator 10 in a state where the base member of the FPC 12 at the side of the backing members 13 is removed. The FPC 12 is divided into five sections (portions) roughly. Specifically, the FPC 12 is divided into a vibration section 12a that is joined with the piezoelectric device 11b and vibrates with the vibration body 11, a first fixing section 12c1 and second fixing section 12c2 that are fixed to the base 3 through the backing members 13, a first support section 12b1 that supports the vibration body 11 by connecting the vibration section 12a to the first fixing section 12c1, and a second support section 12b2 that supports the vibration body 11 by connecting the vibration section 12a to the second fixing section 12c2.

The conduction members 12d consists of wirings having a power supply function and a wiring having a ground (GND) function. Specifically, the conduction members 12d consist of a first power supply wiring 12d1 connected to the A-phase electrode 11b1 of the piezoelectric device 11b, a second power supply wiring 12d2 connected to the B-phase electrode 1b2, and a GND wiring 12d3 connected to the GND electrode 11b3 in order to take a ground. The first power supply wiring 12d1, second power supply wiring 12d2, and GND wiring 12d3 extend from a connector (not shown) connected to a power supply circuit board (not shown) toward the first fixing section 12c1, and extend from the first fixing section 12c1 to the vibration section 12a through the first support section 12b1. The first power supply wiring 12d1, second power supply wiring 12d2, and GND wiring 12d3 further extend from the vibration section 12a to the second fixing section 12c2 through the second support section 12b2. The vibration body 11 and driven body 2 are constituted so as to move relatively in the direction (±X axial direction) along which the first fixing section 12c1, first support section 12b1, vibration section 12a, second support section 12b2, and second fixing section 12c2 line up. Such a configuration enables the vibration actuator to be miniaturized in the Y-axis direction.

The wiring shapes in the first support section 12b1 and second support section 12b2 in the XY plane significantly affect the mode shape and resonance frequency of the vibration excited in the vibration body 11. A reason will be described below. That is, the vibration body 11 has a symmetrical shape about both a first symmetry axis and second symmetry axis that intersect perpendicularly mutually in the XY plane. Moreover, the conduction members 12d have symmetrical shapes in the first support section 12b1 and second support section 12b2 about both the first symmetry axis and second symmetry axis. It should be noted that the first symmetry axis and second symmetry axis intersect perpendicularly mutually, intersect perpendicularly with the thickness direction of the vibration body 11, and are respectively parallel to the long side and the short side of the vibration body 11. The "symmetrical shape" means that the shape is considered as approximately symmetry. Specifically, the symmetry is not necessarily needed unless causing the state shown in the graph in FIG. 6B mentioned later.

When the size of the vibration body is large enough with respect to the FPC like the conventional technique, the effect of the FPC on the oscillation characteristic of the vibration body (the drive performance of the vibration actuator) is able to be disregarded. However, when the vibration body is miniaturized (for example, when the long side of the rectangular elastic body is less than 6 mm), the rigidity difference between the wirings (conduction members) like copper foil and the vibration body becomes small, because the rigidity of the vibration body decreases. For example, since the rigidity difference between the polyimide film as the base member and the vibration body is extremely large, the rigidity of the base member (film) constituting the FPC can be disregarded, and the junction of the vibration body and polyimide film becomes equivalent to a free end approximately for the vibration body. However, when the rigidity difference became small, the junction of the vibration body and conduction members cannot be considered as a free end approximately. And accordingly, a part of energy of the vibration excited in the vibration body transmits to the junction. Accordingly, the miniaturization of the vibration actuator 10 increases the effect of the portion of the conduction members 12d extended from the vibration section 12a on the shape of the vibration body 11 that determines the mode shape and resonance frequency.

Figure 12:
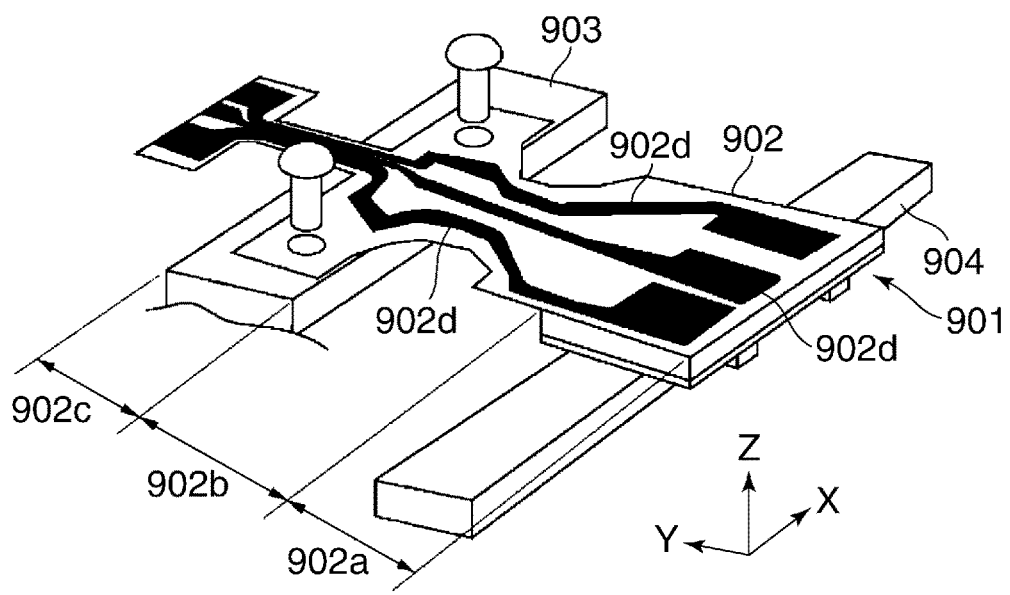
FIG. 12 is a perspective view schematically showing a conventional vibration actuator.
Figure 13:
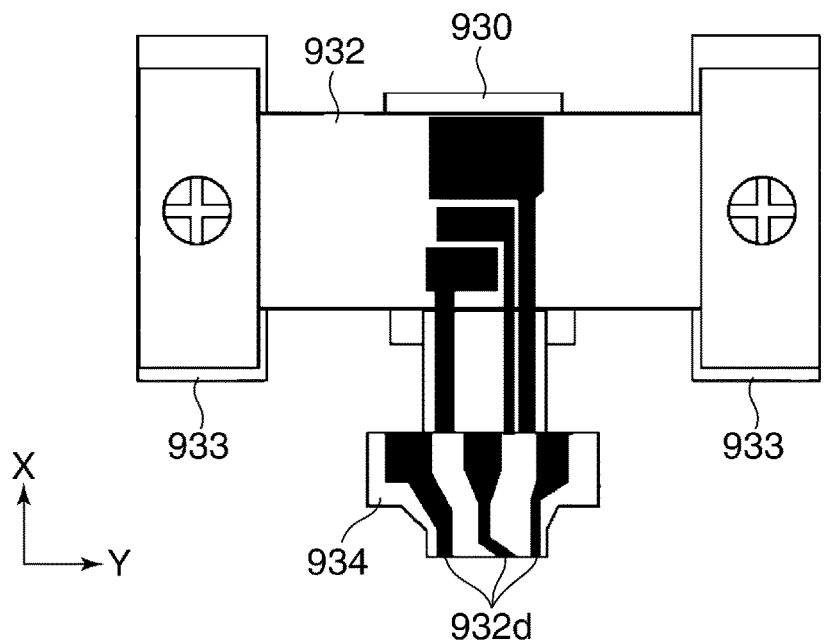
FIG. 13 is a plan view showing a support mechanism for a vibration body of another conventional vibration actuator.
Figure 14:
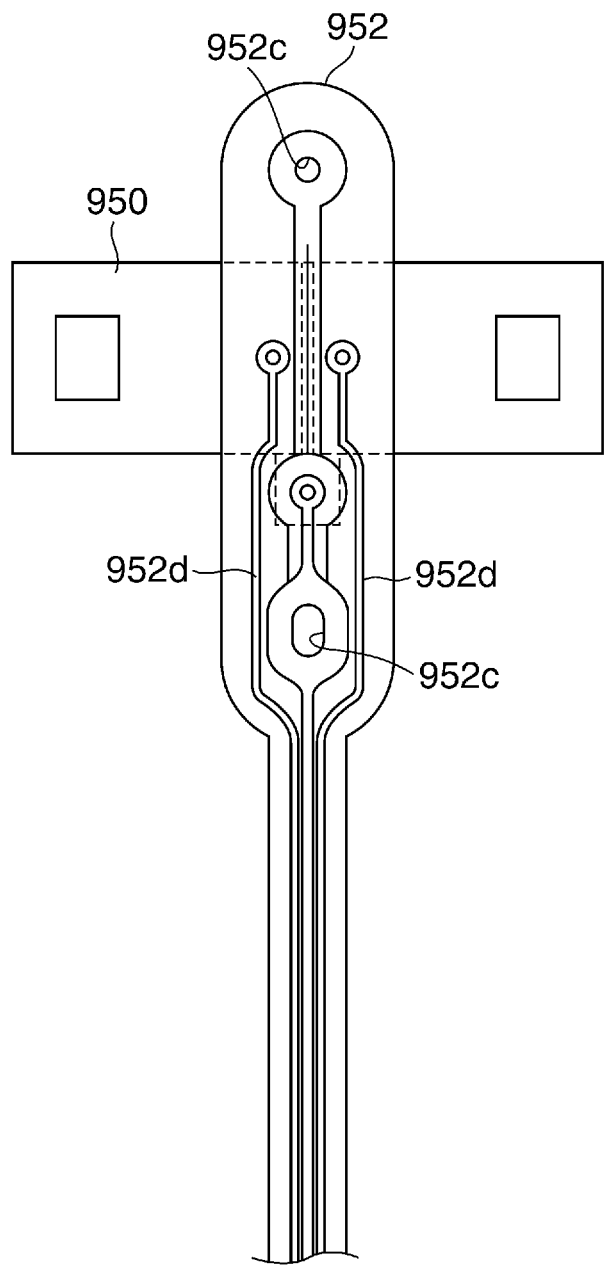
FIG. 14 is a plan view showing a support mechanism for a vibration body of still another conventional vibration actuator.

For example, the conduction members on the FPC extend from the vibration body in only one direction toward the connector of the power supply circuit in the conventional vibration bodies shown in FIG. 12, FIG. 13, and FIG. 14. Accordingly, if such an FPC is applied to the miniaturized vibration body 11, the shape of combination of the vibration body 11 and conduction members on the FPC is asymmetrical, which changes the mode shape from a desired shape. Moreover, the support mechanism described with reference to FIG. 13 causes the above-mentioned problem that the vibrational state of the vibration body 930 becomes unstable because of the arrangements of the wirings on the FPC 932.

Consequently, the conduction members 12d of the vibration actuator 10 extend in the two directions that are the direction toward the connector of the power supply circuit and the opposite direction. Then, the FPC 12 of the vibration actuator 10 is fixed at two positions extended from the vibration body 11 using the backing members 13 so that the desired vibrational state occurs in the vibration body 11. That is, the symmetry of the conduction members 12d is ensured by arranging the vibration body 11 at the center and by extending the conduction members 12d in the both directions. Accordingly, the vibrational state of the vibration body 11a is more stable than that of an asymmetrical configuration. Moreover, the mode shape of the vibration excited in the vibration body 11 is also determined by the fixing position of the FPC 12.

It is important that the wiring shapes in the first support section 12b1 and second support section 12b2 of the conduction members 12d have symmetry as with the vibration body 11 in order to maintain the symmetry of the mode shape of the vibration excited in the vibration body 11. Accordingly, in order to maintain the symmetrical mode shape, dummy wirings 12f, which are not used for power supply or grounding, are provided in the second support section 12b2 and second fixing section 12c2 in this embodiment.

Figure 4A:
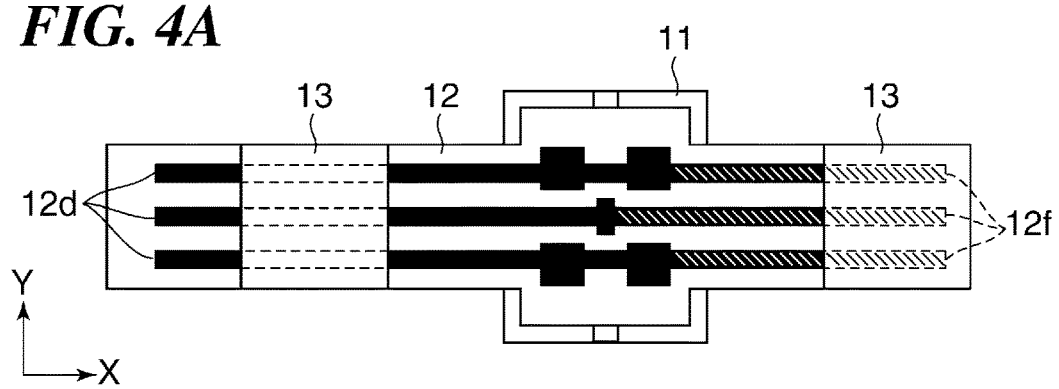
FIG. 4A and FIG. 4B are back views respectively showing a case where dummy wirings are provided in the FPC constituting the vibration actuator shown in FIG. 1A and a case where dummy wirings are not provided.
Figure 4B:
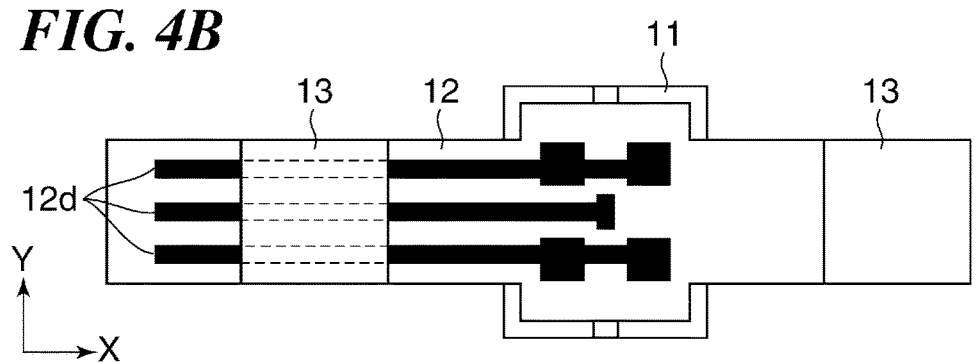
Figure 5A:
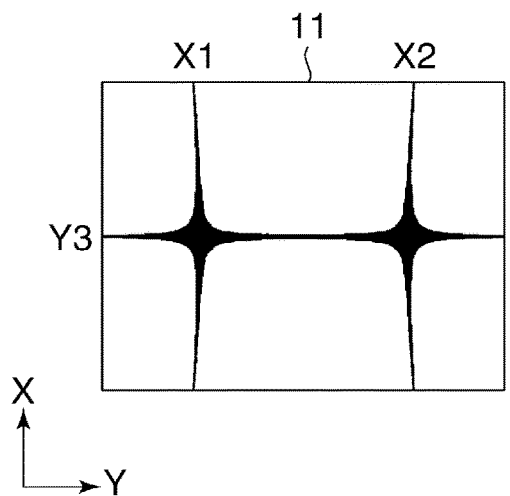
FIG. 5A and FIG. 5B are views describing effects of the dummy wirings provided in the FPC constituting the vibration actuator shown in FIG. 1A on a second vibration mode.
Figure 5B:
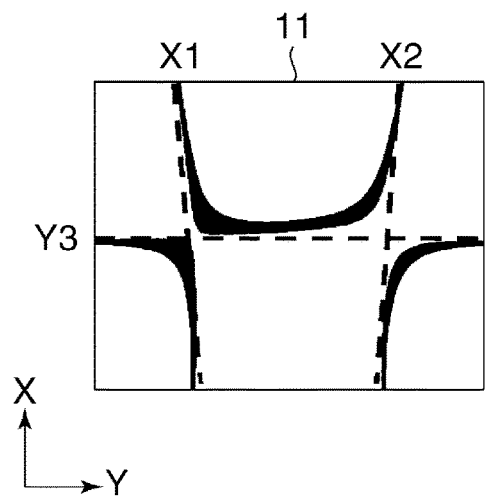

Hereinafter, the effect of the dummy wirings 12f on the mode shape of the vibration excited in the vibration body 11 will be described. FIG. 4A is a back view showing the wiring shape where the dummy wirings 12f are provided, and is approximately identical to FIG. 3B except for illustrations of the conduction members 12d in the first fixing section 12c1 and second fixing section 12c2. FIG. 4B is a back view showing the wiring shape where the dummy wirings 12f are not provided, and shows a configuration of a comparative example against the FPC 12. FIG. 5A is a view showing nodal lines of the vibration in the second bending vibration mode excited in the vibration body 11 where the FPC 12 shown in FIG. 4A that has the dummy wirings 12f is attached to the vibration body 11. FIG. 5B is a view showing nodal lines of the vibration in the second bending vibration mode excited in the vibration body 11 where the FPC shown in FIG. 4B that does not have the dummy wirings 12f is attached to the vibration body 11.

When the vibration in the second bending vibration mode mentioned above is excited in the vibration body 11 in the case where the dummy wirings 12f are provided as shown in FIG. 4A, the vibration that exhibits the ideal nodal lines X1, X2, and Y1 as shown in FIG. 5A is excited. On the other hand, when the vibration in the second bending vibration mode is excited in the vibration body 11 in the case where the dummy wirings 12f are not provided as shown in FIG. 4B, the vibration that exhibits the nodal lines X1, X2, and Y1 that are deviated from the ideal positions as shown in FIG. 5B is excited. As a result, when the dummy wirings 12f are not provided, even if the vibration in the first bending vibration mode and the vibration in the second bending vibration mode are excited in the vibration body 11 with the predetermined phase difference, it is impossible to generate a desired vibration amplitude to produce elliptic movement at the front ends (contact portion) of the projections 11c, and it is impossible to drive the driven body 2 efficiently. Moreover, in such a case, when the driven body 2 is frictionally driven, performance of driving in one direction along the X axis differs from that in the other direction along the X axis, and the driven body 2 may not be driven when the deviation of the mode shape becomes large.

Figure 6A:
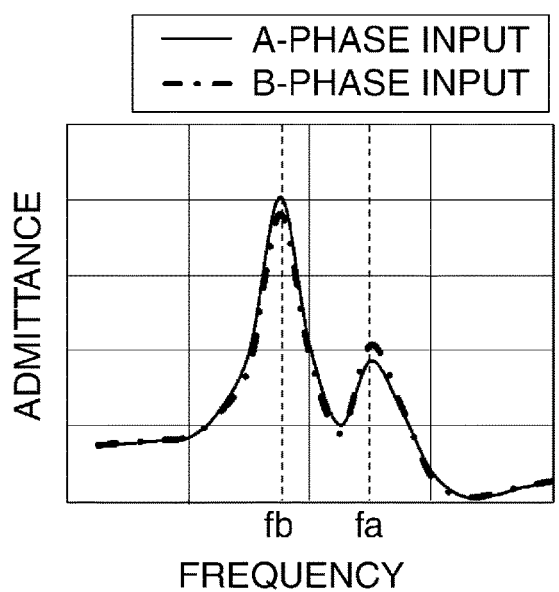
FIG. 6A and FIG. 6B are graphs describing effects of the dummy wirings provided in the FPC constituting the vibration actuator shown in FIG. 1A on a frequency-admittance characteristic of the piezoelectric device.
Figure 6B:
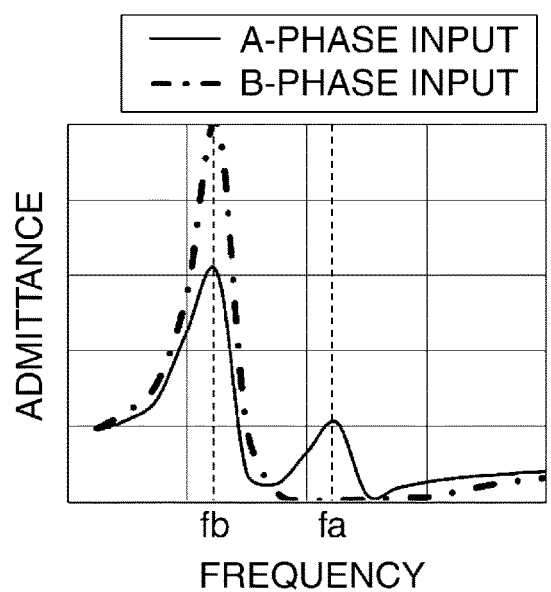

Subsequently, an effect of the dummy wirings 12f on a frequency-admittance characteristic of the piezoelectric device 11b will be described. FIG. 6A is a graph showing the frequency-admittance characteristic of the piezoelectric device 11b that is exhibited when the vibration body 11 that does not come into press contact with the driven body 2 is excited using the FPC 12 shown in FIG. 4A that has the dummy wirings 12f. FIG. 6B is a graph showing the frequency-admittance characteristic of the piezoelectric device 11b that is exhibited when the vibration body 11 that does not come into press contact with the driven body 2 is excited using the FPC shown in FIG. 4B that does not have the dummy wirings 12f. It should be noted that the frequency-admittance characteristic in each of FIG. 6A and FIG. 6B is obtained by applying predetermined alternating voltage to the piezoelectric device 11b while sweeping frequency according to a known measuring method.

In each of the graphs in FIG. 6A and FIG. 6B, the frequency fb represents the resonance frequency in the first bending vibration mode, and the frequency fa represents the resonance frequency in the second bending vibration mode. In the case where the FPC that has the dummy wirings 12f is used, a frequency and degree of a resonance peak (solid line) appeared by applying the alternating voltage V1 to the A-phase electrode 11b1 are almost the same as a frequency and degree of a resonance peak (alternate long and short dash line) appeared by applying the alternating voltage V2 to the B-phase electrode 11b2. Accordingly, even if the alternating voltage is applied to any one of the A-phase electrode 11b1 and the B-phase electrode 11b2, the vibrations in the two bending vibration modes can be excited. On the other hand, in the case where the FPC that does not have the dummy wirings 12f is used, a frequency and degree of a resonance peak (solid line) appeared by applying the alternating voltage V1 to the A-phase electrode 11b1 are different from a frequency and degree of a resonance peak (alternate long and short dash line) appeared by applying the alternating voltage V2 to the B-phase electrode 11b2. In particular, when the alternating voltage is applied to the B-phase electrode 11b2, there is no peak at the frequency fa, which shows that the vibration in the second bending vibration mode cannot be excited. Accordingly, since the desired elliptic movement to frictionally drive the driven body 2 cannot be generated at the front ends (contact portion) of the projections 11c, the driven body 2 cannot be driven stably, which may preclude the reciprocation operation.

It should be noted that the wiring shape of the conduction members 12d in the first support section 12b1 and second support section 12b2 is determined by the wiring shape in the vibration section 12a, first fixing section 12c1, and second fixing section 12c2. However, it is not actually easy to attain complete symmetry of the wiring shape of the conduction members 12d in the first support section 12b1 and second support section 12b2 due to effects of part tolerance, assembling error, etc. Then, the state where the vibration in the desired resonance mode used for driving cannot be excited in this embodiment is the state where no resonance peak appears in at least one of two resonance frequencies in the two bending vibration modes, as shown in FIG. 6B. Accordingly, the symmetry of the wiring shape of the conduction members 12d in the first support section 12b1 and second support section 12b2 may be deviated from the complete symmetry as long as two resonance peaks appear so as to drive the driven body 2 to reciprocate even when alternating voltage is applied to either the A-phase electrode 11b1 or the B-phase electrode 11b2.

As mentioned above, it is important that the wiring shape of the conduction members 12d in the first support section 12b1 and second support section 12b2 has symmetry as with the vibration body 11. The deviation from the ideal mode shape increases as the deviation from the complete symmetry increases. On the other hand, since the constraining force for the vibration body 11 by the FPC 12 decreases as the distances of the positions of the first fixing section 12c1 and the second fixing section 12c2 from the vibration body 11 increase, the effect of the symmetry of shape becomes small. However, since a spring constant in the pressing (Z-axis) direction in the first support section 12b1 and second support section 12b2 decreases as the distances of the positions of the first fixing section 12c1 and the second fixing section 12c2 from the vibration body 11 increase, it becomes impossible to support the vibration body 11 stably.

Consequently, the wiring shape of the conduction members 12d in the first support section 12b1 and second support section 12b2, and the arrangement of the first fixing section 12c1 and second fixing section 12c2 are designed so as to be linearly symmetrical about both the first symmetry axis and second symmetry axis of the vibration body 11. This stabilizes the vibrational state of the vibration body 1, which attains a compact vibration actuator 10 that is able to take out friction driving force efficiently. Moreover, since the vibration actuator 10 has the configuration that the FPC 12 functions as a support member supporting the vibration body 11, another support member for supporting the vibration body 11 is unnecessary, which avoids an increase in cost. Moreover, since the backing members 13 of which the rigidity is sufficiently higher than that of the first support section 12b1 and second support section 12b2 are provided on the first fixing section 12c1 and the second fixing section 12c2, the vibration that transmits through the conduction members 12d is obstructed by the first fixing section 12c1 and second fixing section 12c2. That is, since the transmission of the vibration is obstructed without depending on the fixing method for the FPC 12, the vibrational state of the vibration body 11 becomes more stable. In order to stabilize the posture of the vibration body 11 against pressure force, the distances from the vibration body 11 to the fixing sections 12c1 and 12c2 need to be suitably set up according to the specification.

Since the wirings of the conduction members 12d in the vibration section 12a are united with the vibration body 11, their effect on the vibration body 11 is smaller than the effect of the wirings of the conduction members 12d in the first support section 12b1 and second support section 12b2 on the vibration body 11. However, it is preferable that the wiring shape of the conduction members 12d in the vibration section 12a be linearly symmetrical about both the first symmetry axis and the second symmetry axis as shown in FIG. 3B. Accordingly, a rectangular pad is provided at the center of the GND wiring 12d3, and a pair of rectangular pads are provided in each of the power supply wirings 12d1 and 12d2 at both sides of the rectangular pad of the GND wiring 12d3 in the X-axis direction in this embodiment. The base member of the FPC 12 at the side of the joined surface to the piezoelectric device 11b has an opening in an area where the GND electrode 11b3 faces the pad of the GND wiring 12d3. Similarly, the base member of the FPC 12 at the side of the joined surface to the piezoelectric device 11b has an opening in an area where the A-phase electrode 11b1 faces one of the pads of the first power supply wiring 12d1, and has an opening in an area where the B-phase electrode 11b2 faces one of the pads of the second power supply wiring 12d2. This ensures the symmetry of the wiring shape of the conduction members 12d in the vibration section 12a, and enables supply of the electric power to the piezoelectric device 11b while preventing a short circuit by the conduction members 12d between the A-phase electrode 11b1, the B-phase electrode unit 11b2, and the GND electrode 11b3. The pads of the first power supply wiring 12d1 and the second power supply wiring 12d2 that do not face the openings formed in the base member of the FPC 12 can be called a dummy pad.

It should be noted that the difference between the rigidity of the base member constituting the FPC 12 and the rigidity of the conduction members 12d is not so large in the first support section 12b1 and second support section 12b2. Accordingly, the transmission of the vibration from the conductive parts 12d to the base member may change the vibration state of the vibration body 11. In such a case, it is preferable that the shape of the base member in the first support section 12b1 and second support section 12b2 have symmetry equivalent to the symmetry of the shape of the vibration body 11 as with the conduction members 12d. It is not easy to achieve complete symmetry about the symmetry described here due to effects of part tolerance, assembling error, etc. Accordingly, deviation of symmetry is allowed within a range equivalent to the tolerance of the symmetry of the wiring shape of the conduction members 12d in the first support section 12b1 and second support section 12b2.

Although the base member compensates the function for supporting the vibration body 11 in the FPC 12 as the power feed member in the above-mentioned description, the vibration actuator of the present invention is not limited to such a configuration. A metal wire or metallic foil may bear the supporting function. Moreover, the vibration modes used for driving the vibration body 11 are not limited to the two bending vibration modes shown in FIG. 3. Other vibration modes (for example, higher order vibration modes) may be used as long as the elliptic movements are generated at the front ends (contact portions) of the projections 11c.

Figure 7:
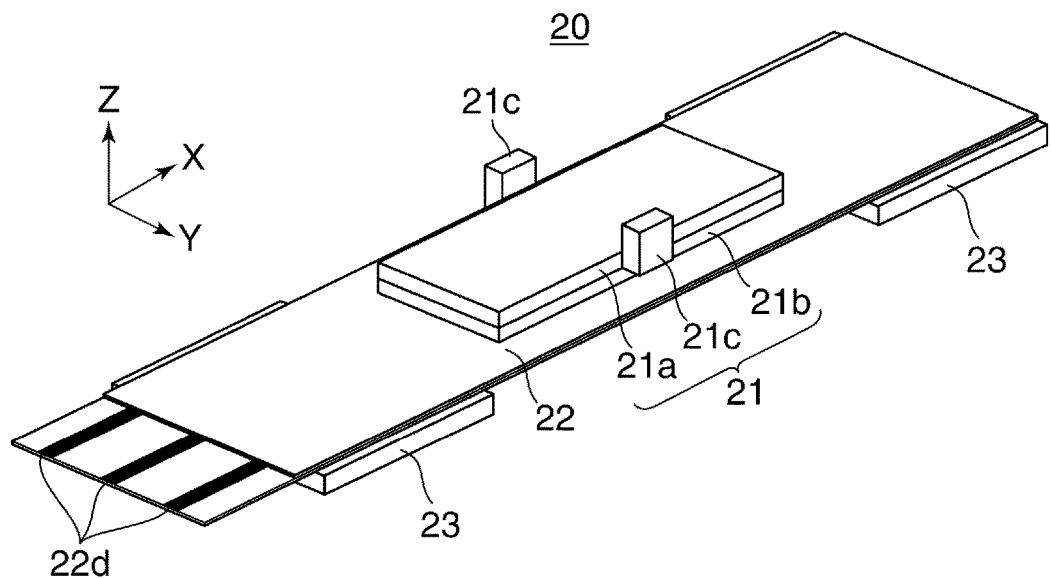
FIG. 7 is a perspective view schematically showing a vibration body constituting a vibration actuator according to a second embodiment of the present invention.

Next, a second embodiment of the present invention will be described. FIG. 7 is a perspective view schematically showing a configuration of a vibration body 21 constituting a vibration actuator 20 according to the second embodiment of the present invention. It should be noted that FIG. 7 does not show the driven body 2. The driven body 2 is arranged so as to come into press contact with the vibration body 21 in the Z-axis direction in compliance with the state shown in FIG. 1A.

The vibration actuator 20 has the vibration body 21, an FPC 22, and backing members 23. The vibration body 21 has an elastic body 21a, a piezoelectric device 21b, and a pair of projections 21c. Although the longitudinal direction of the vibration body 11 described in the first embodiment is in the Y-axis direction, the longitudinal direction of the vibration body 21 described in the second embodiment is in the X-axis direction, which is a difference from the vibration body 11. The rectangular, tabular piezoelectric device 21b is joined to one side of the rectangular, tabular elastic body 21a. Moreover, the projections 21c are provided in the elastic body 21a with a predetermined gap in the Y-axis direction as with the projections 11c of the vibration body 11. The projections 21c project from one surface of the elastic body 21a in the +Z-axis direction toward the other surface to which the piezoelectric device 21b is not joined. In the Z-axis direction, the front ends of the projections 21c come into press contact with the driven body 2 (not shown). The vibration body 21 is supported by the FPC 22 by joining the piezoelectric device 21b to the FPC 22. The FPC 22 is fixed to a base (not shown) through the backing members 23. It should be noted that description about the backing members 23 is omitted because they are identical to the backing members 13 described in the first embodiment. The FPC 22 has a three-layer structure that is formed by sandwiching conduction members 22d between two base members as with the FPC 12 described in the first embodiment.

Figure 8A:
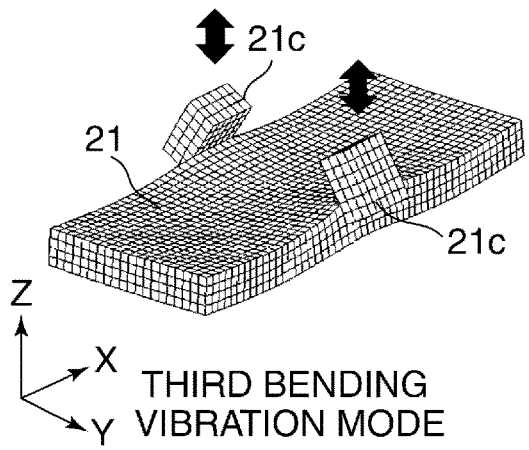
FIG. 8A and FIG. 8B are perspective views showing two bending vibration modes excited in the vibration body constituting the vibration actuator shown in FIG. 7.
Figure 8B:
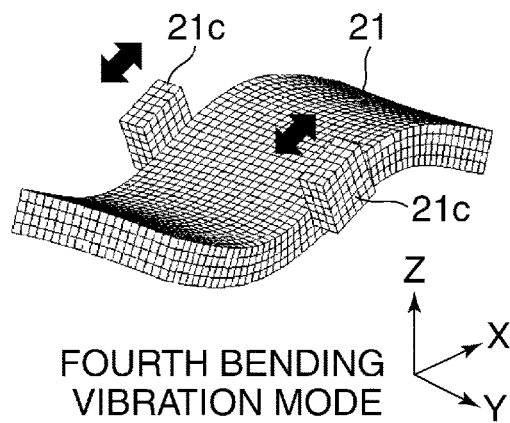

FIG. 8A is a perspective view describing vibration in a third bending vibration mode excited in the vibration body 21 for frictionally driving the driven body 2. Moreover, FIG. 8B is a perspective view describing vibration in a fourth bending vibration mode excited in the vibration body 21 for frictionally driving the driven body 2. When the vibration in the third bending vibration mode is excited in the vibration body 21, variation displacements in the Z-axis direction occur at the front ends of the projections 21c. Moreover, when the vibration in the fourth bending vibration mode is excited in the vibration body 21, variation displacements in the X-axis direction occur at the front ends of the projections 21c. The shape of the vibration body 21 is designed so as to approximate the resonance frequencies in the third and fourth bending vibration modes mutually.

An A-phase electrode and a B-phase electrode (not shown) are provided in the surface of the piezoelectric device 21b that is joined to the FPC 22 so as to divide into two in the X-axis direction. An FPC-side GND electrode is provided between the A-phase electrode and the B-phase electrode so as to be insulated from these electrodes. A common electrode (an elastic-body-side GND electrode) is provided in the surface of the piezoelectric device 21b that is joined to the elastic body 21a. The common electrode is electrically connected to the FPC-side GND electrode via a through hole electrode that penetrates a center of the piezoelectric device 21b in the Z-axis direction. When the alternating voltages are applied to the A-phase electrode and the B-phase electrode with the phase difference of 90 degrees as with the first embodiment, for example, the vibrations in the third bending vibration mode and fourth bending vibration mode are exited simultaneously. Thereby, the elliptic movements in the ZX plane can be generated at the front ends (contact portions) of the projections 21c, which frictionally drive the driven body 2 in the X-axis direction. As a result, the driven body 2 and the vibration body 21 can be moved relatively in the X-axis direction.

Figure 9A:
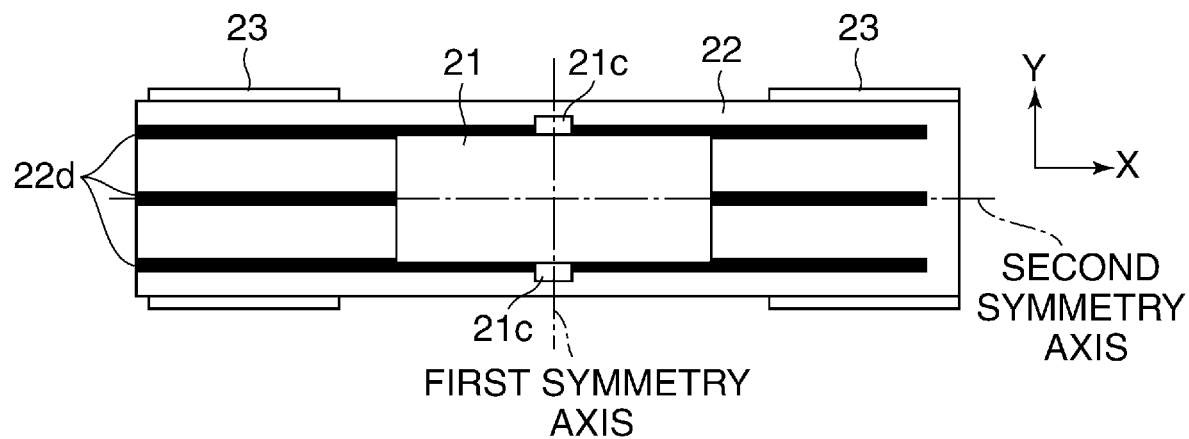
FIG. 9A, FIG. 9B, and FIG. 9C are a top plan view, side view, and back view showing the vibration actuator shown in FIG. 7.
Figure 9B:
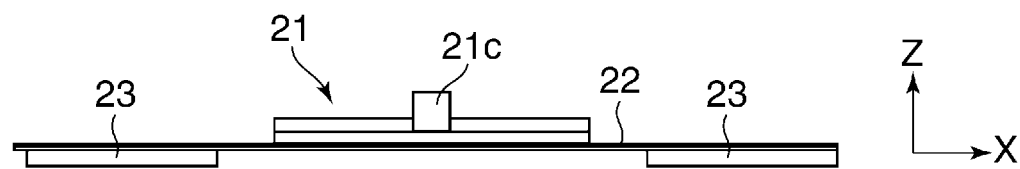
Figure 9C:
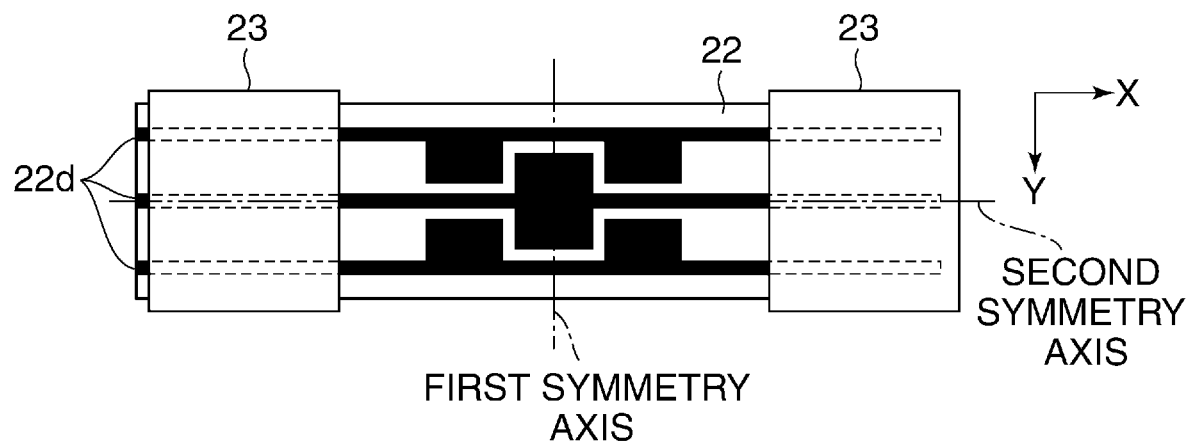

FIG. 9A is a top view showing the vibration actuator 20 in a state where the base member of the FPC 22 at the side of the vibration body 21 is removed. FIG. 9B is a side view showing the vibration actuator 20. FIG. 9C is a back view showing the vibration actuator 20 in a state where the base member of the FPC 22 at the side of the backing members 23 is removed. It should be noted that the driven body 2 is not shown in FIG. 9A through FIG. 9C.

In the vibration body 21, the ratio of the length of the long side to the length of the short side of the elastic body 21a is large in order to approximate the resonance frequencies in the third and fourth bending vibration modes mutually. Accordingly, when the vibration body 21 is miniaturized, the length of the short side (the length in the Y-axis direction) becomes extremely short. On the other hand, it is necessary to provide two power supply wirings for supplying electric power to the piezoelectric device 21b and a GND wiring in the FPC 22. When symmetry is taken into consideration, it is preferable to provide the power supply wirings so as to sandwich the GND wiring in the Y-axis direction. At this time, it is necessary that the conduction members 22d as the power supply wirings and GND wiring be provided in the FPC 22 with predetermined gaps therebetween in the Y-axis direction in order to prevent a short circuit. Accordingly, as shown in FIG. 9A, the gap between the power supply wirings in the Y-axis direction is set to be longer than the length in the short side of the vibration body 21. Moreover, in order to secure a contact area between each power supply wiring and an electrode of the piezoelectric device 21b, as shown in FIG. 9C, a rectangular pad is provided at the center of the GND wiring, and a pair of convex pads are provided in each of the power supply wirings at both sides of the rectangular pad in the X-axis direction. The convex pads are projected toward the GND wiring. The base member of the FPC 22 has openings in an area that faces the rectangular pad of the GND wiring and in an area that faces one of the convex pads of each of the power supply wirings. The other pad of each of the power supply wirings is equivalent to a dummy pad.

Even when the conduction members 22d are configured as shown in FIG. 9C, the mode shape can be maintained, because the shapes of the conduction members 22d extended from the vibration body 21 in support sections of the FPC 22 are symmetrical about each of a first symmetry axis and a second symmetry axis of the shape of the vibration body 21. The support sections of the FPC 22 are sections between the section to which the vibration body 21 is joined and the sections to which the backing members 23 are joined, and are equivalent to the first support section 12b1 and the second support section 12b2 described in the first embodiment.

It should be noted that the conduction members 22d are not necessarily extended from the short sides of the vibration body 21 that face fixing sections of the FPC 22 to which the backing members 23 are joined in the X-axis direction. That is, the wiring shape of the conduction members 22d in the support sections of the FPC 22 should have symmetry about each of the two symmetry axes of the shape of the vibration body 21. Moreover, the configuration that excites the vibrations in the third bending vibration mode and fourth bending vibration mode by applying the alternating voltages to the piezoelectric device 21b that has the A-phase electrode, B-phase electrode, and GND electrode is described in the second embodiment. However, when vibration modes in which the vibration body is driven by a floating drive is used, the piezoelectric device 21b is not required to provide the GND electrode. And such a configuration is also applicable to the piezoelectric device 11b described in the first embodiment.

Next, a microscope and an image pickup apparatus will be described as electronic apparatuses equipped with the vibration actuator 10 according to the first embodiment of the present invention. However, the application of the vibration actuator 10 is not limited to these apparatuses. The vibration actuator 10 is widely applicable to an electronic apparatus equipped with a driven part that needs positioning.

Figure 10:
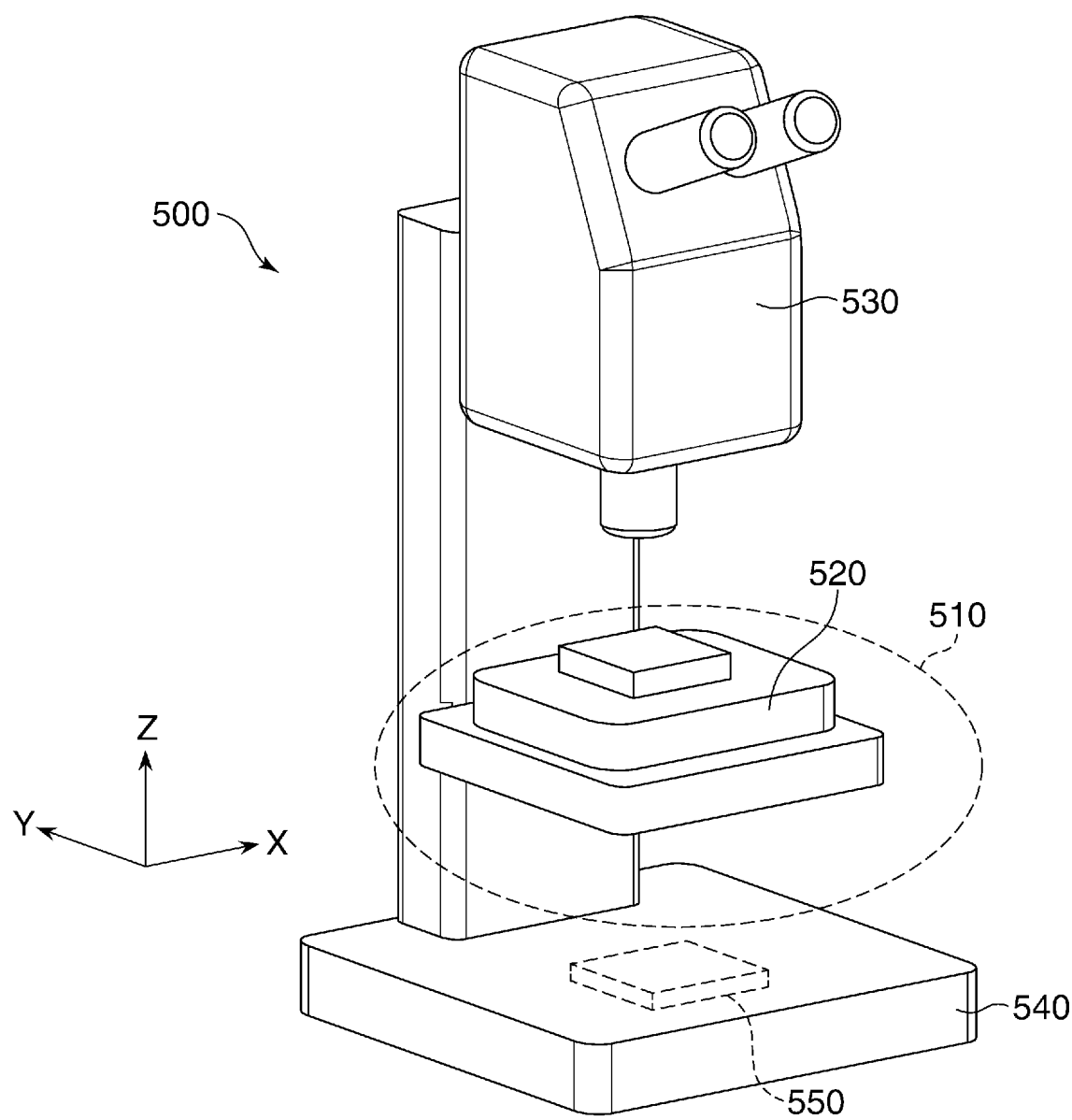
FIG. 10 is an external perspective view of a microscope equipped with the vibration actuator shown in FIG. 1A.

FIG. 10 is an external perspective view of a microscope 500 equipped with the vibration actuator 10 shown in FIG. 1A. The microscope 500 is provided with an image pickup unit 530 in which an image pickup device and optical system are built, an automatic stage unit 510 that has a stage 520 that is a driven body arranged movable in an XY plane on a base, and a base plate 540. A control device 550 that controls the vibration actuator 10 by supplying electric power to the piezoelectric device 11b is arranged in the base plate 540. It should be noted that the control device 550 may be provided in the image pickup unit 530. The microscope 500 uses at least two vibration bodies 11. At least one vibration body 11 is used for driving the stage 520 in an X-axis direction, and at least one other vibration body 11 is used for driving the stage 520 in a Y-axis direction.

When an observation area becomes wide at a time of taking an enlarged image of an object put on the stage 520 by the image pickup unit 530, the object is moved by driving the automatic stage unit 510 to move the stage 520 in the X-axis direction and Y-axis direction. Many images are taken while moving the object. When the many images are joined by an image process using a computer (not shown), a wide, high-definition observed image is obtained.

Figure 11A:
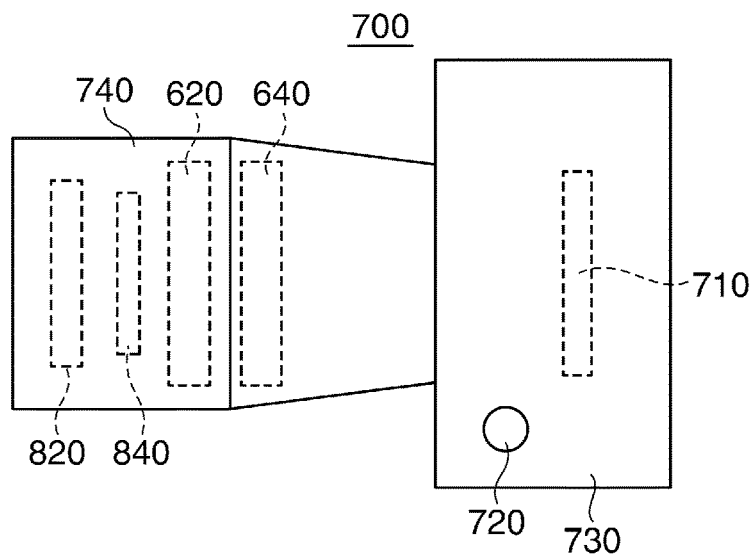
FIG. 11A is a plan view schematically showing an image pickup apparatus equipped with the vibration actuator shown in FIG. 1A.

FIG. 11A is a top plan view schematically showing a configuration of an image pickup apparatus 700. The image pickup apparatus 700 is provided with a camera body 730 in which an image pickup device 710 and a power button 720 are mounted. Moreover, the image pickup apparatus 700 is provided with a lens barrel 740 that has a first lens group (not shown), a second lens group 820, a third lens group (not shown), a fourth lens group 840, and vibration driving apparatuses 620 and 640. The lens barrel 740 is detachable to the camera body 730 as an interchangeable lens. The lens barrel 740 that is suitable to a photographing object can be attached to the camera body 730. In the image pickup apparatus 700, the second lens group 820 and the fourth lens group 840 are respectively driven by the two vibration driving apparatuses 620 and 640.

Although a detailed configuration of the vibration driving apparatus 620 is not shown, the vibration driving device 620 has a circular driven body, the vibration bodies 11 that rotate the driven body, and a drive circuit. For example, the three circular vibration bodies 11 are arranged on a circular base at equal intervals in a circumferential direction of the base. Each of the vibration bodies 11 is supported by the FPC 12 that is fixed to the base via the backing members 13 so that a line connecting the two projections 11c becomes a normal line of the same circumference. The driven body and the base are mounted in the lens barrel 740 so that the projections 11c of the driven bodies 11 come into press contact with the driven body in an optical axis direction and so that radial directions of the driven body and the base intersect perpendicularly with an optical axis. The vibration driving device 620 rotates the driven body around the optical axis and moves the second lens group 820 in the optical axis direction by converting the rotation output of the driven body into a linear movement in the optical axis direction via cams, gears, or the like (not shown). The vibration driving device 640 moves the fourth lens group 840 in the optical axis direction using the same configuration as the vibration driving device 620. It should be noted that the vibration body 11 can drive the driven body 2 in one direction (an X-axis direction). Accordingly, the following configuration may be employed. The vibration body 11 is arranged so that the X-axis direction (short-side direction) of the vibration body 11 is parallel to the optical axis direction of the lens barrel 740. And a lens-holding member that holds a lens is directly driven in the optical axis direction as a driven body.

Figure 11B:
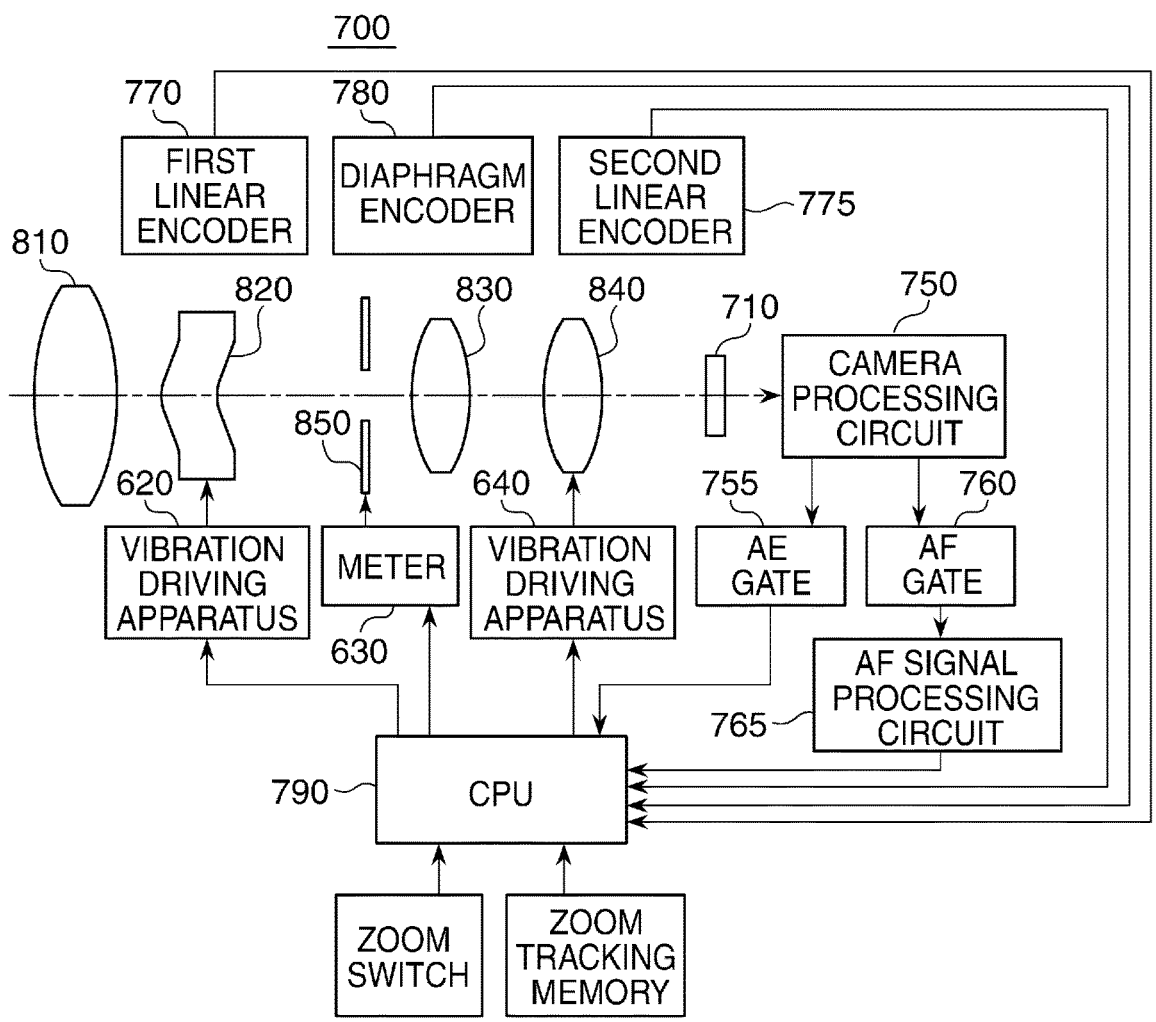
FIG. 11B is a block diagram schematically showing configurations of an optical system and a control system of the image pickup apparatus shown in FIG. 11A.

FIG. 11B is a block diagram schematically showing configurations of the optical system and a control system of the image pickup apparatus 700. The first lens group 810, the second lens group 820, the third lens group 830, the fourth lens group 840, and a light amount adjustment unit 850 are arranged at the specified positions on the optical axis in the lens barrel 740. Light passing through the first, second, third, and fourth lens groups 810, 820, 830, and 840 and the light amount adjustment unit 850 forms an image on the image pickup device 710. The image pickup device 710 converts an optical image into an electrical signal and outputs, and its output is sent to a camera processing circuit 750.

The camera processing circuit 750 applies amplification, gamma correction, etc., to the output signal from the image pickup device 710. The camera processing circuit 750 is connected to a CPU 790 via an AE gate 755 and is connected to the CPU 790 via an AF gate 760 and an AF signal processing circuit 765. A video signal to which the predetermined process was applied in the camera processing circuit 750 is sent to the CPU 790 via the AE gate 755, and via the AF gate 760 and the AF signal processing circuit 765. It should be noted that the AF signal processing circuit 765 extracts a high frequency component of the video signal, generates an evaluation value for autofocus (AF), and supplies the evaluation value to the CPU 790.

The CPU 790 is a control circuit that controls the entire operation of the image pickup apparatus 700, and generates control signals for determining exposure and focusing on the basis of the obtained video signal. The CPU 790 adjusts the positions of the second lens group 820 and the fourth lens group 840 in the optical axis direction by controlling the vibration driving devices 620 and 640 so as to obtain the suitable focusing state. Moreover, the CPU 790 adjusts an aperture diameter of the light amount adjustment unit 850 by controlling a meter 630 so as to obtain the determined exposure. Under the control by the CPU 790, the vibration driving device 620 moves the second lens group 820 in the optical axis direction, the vibration driving device 640 moves the fourth lens group 840 in the optical axis direction, and the meter 630 controls the light amount adjustment unit 850.

The position of the second lens group 820 that is driven by the vibration driving device 620 in the optical axis direction is detected by a first linear encoder 770. The CPU 790 is notified of the detection result, and feeds back the detection result to the drive of the vibration driving device 620. Similarly, the position of the fourth lens group 840 that is driven by the vibration driving device 640 in the optical axis direction is detected by a second linear encoder 775. The CPU 790 is notified of the detection result, and feeds back the detection result to the drive of the vibration driving device 640. The aperture diameter of the light amount adjustment unit 850 is detected by a diaphragm encoder 780. The CPU 709 is notified of the detection result, and feeds back to the drive of the meter 630.

When the vibration actuator 10 is used to move a lens group in the image pickup apparatus 700 in the optical axis direction, large holding force is obtained even when the lens group stops. Thereby, even if external force acts on the lens barrel 740 or the camera body 730, a deviation of the lens group is kept under control. When an image stabilization lens is built in the lens barrel 740, an image stabilization unit, which moves the image stabilization lens in any directions in a plane perpendicular to the optical axis, can employ the vibration body 11. In such a case, one or more vibration bodies 11 that drive a lens holding member that holds the image stabilization lens are arranged so as to move the lens holding member in two directions that intersect perpendicularly in the plane perpendicular to the optical axis. It should be noted that the image stabilization unit may be configured to move the image pickup device 710 that is built in the camera body 730 in any directions in the plane perpendicular to the optical axis in place of the configuration that drives the image stabilization lens.

OTHER EMBODIMENTS

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Furthermore, the embodiments mentioned above show examples of the present invention, and it is possible to combine the embodiments suitably. For example, although the vibration body 11 has the two projections 11c, the friction drive of the driven body 2 is possible even when only one projection is provided. In this case, the projection is provided in the center of the top face (XY surface) of the elastic body 11a. Moreover, although it is preferable that a dummy pad and dummy wiring are made from the same material as other wiring and pad, at least one part of a dummy pad and dummy wiring may be made from different material unless causing the state shown in the graph in FIG. 6B.

This application claims the benefit of Japanese Patent Application No. 2016-152806, filed Aug. 3, 2016, and No. 2017-132935, filed Jul. 6, 2017, which are hereby incorporated by reference herein in their entireties.

What is claimed is:

1. A vibration actuator moving a vibration body and a contact body relatively, the vibration actuator comprising:
   a support member that supports the vibration body and supplies electric power to the vibration body, the support member comprising:
   a vibration section joined to the vibration body;
   a first fixing section and a second fixing section that are respectively provided on opposite sides of the vibration body for fixing said support member at a predetermined position;
   a first support section that connects said vibration section with said first fixing section to support the vibration body;
   a second support section that connects said vibration section with said second fixing section to support the vibration body; and
   conduction members that extend from the vibration body to said first fixing section, extend from the vibration body to said second fixing section, and supply electric power to the vibration body,
   wherein wiring shapes of said conduction members in said first support section and said second support section are approximately symmetrical about each of a first symmetry axis and a second symmetry axis which lie in one plane and mutually intersect perpendicularly and are perpendicular to a thickness direction of the vibration body.

2. The vibration actuator according to claim 1, wherein the vibration body has a tabular shape that is symmetrical about each of the first symmetry axis and the second symmetry axis.

3. The vibration actuator according to claim 2, wherein the vibration body has an approximately rectangular shape of which a short side and a long side are approximately parallel to the first symmetry axis and the second symmetry axis, respectively.

4. The vibration actuator according to claim 2, wherein said first fixing section and said second fixing section are provided in positions that are linearly symmetrical about the first symmetry axis and the second symmetry axis.

5. The vibration actuator according to claim 2, wherein shapes of said first support section and said second support section are approximately symmetrical about the first symmetry axis and the second symmetry axis.

6. The vibration actuator according to claim 1, wherein said conduction members have two power supply wirings that are provided with a predetermined gap in a direction that intersects perpendicularly with a direction in which said conduction members extend.

7. The vibration actuator according to claim 6, wherein said conduction members have a wiring for grounding between the two power supply wirings.

8. The vibration actuator according to claim 1, wherein said support member is configured to sandwich said conduction members between two sheet members having rigidity less than rigidity of said conduction members.

9. The vibration actuator according to claim 8, wherein each of said conduction members comprises one of metallic foil and metal wire.

10. The vibration actuator according to claim 1, wherein reinforcement members are provided in said first fixing section and said second fixing section.

11. The vibration actuator according to claim 7, wherein said support member comprises a flexible printed circuit board connected to the vibration body.

12. The vibration actuator according to claim 1, wherein the vibration body has at least one projection provided on a surface facing the contact body.

13. The vibration actuator according to claim 1, wherein the vibration body and the contact body are relatively moved by exciting at least vibration in a first bending vibration mode and vibration in a second bending vibration mode in the vibration body.

14. The vibration actuator according to claim 13, wherein an electro-mechanical energy conversion element provided in the vibration body has a first electrode and a second electrode, and
wherein a frequency-admittance characteristic of the electro-mechanical energy conversion element in each of cases in which alternating voltage is applied to the first electrode and in which alternating voltage is applied to the second electrode has a peak at a resonance frequency in the first bending vibration mode and a peak at a resonance frequency in the second bending vibration mode.

15. The vibration actuator according to claim 13, wherein the resonance frequency in the first bending vibration mode and the resonance frequency in the second bending vibration mode satisfy the following condition:

$$0 < \Delta f < fa \cdot 0.15,$$

where $\Delta f$ is a difference between the resonance frequency in the first bending vibration mode and the resonance frequency in the second bending vibration mode, and fa is a higher resonance frequency among the resonance frequency in the first bending vibration mode and the resonance frequency in the second bending vibration mode.

16. The vibration actuator according to claim 1, wherein at least part of the conduction members is not used for supplying electric power or connection to ground.

17. The vibration actuator according to claim 1, wherein the vibration body and the contact body move relatively in a direction along which said first fixing section, said first support section, said vibration section, said second support section, and said second fixing section are aligned.

18. An electrical apparatus comprising:
a vibration actuator that moves a vibration body and a contact body relatively, the vibration actuator comprising:
a support member that supports the vibration body and supplies electric power to the vibration body, the support member comprising:
a vibration section joined to the vibration body;
a first fixing section and a second fixing section that are respectively provided on opposite sides of the vibration body for fixing said support member at a predetermined position;
a first support section that connects said vibration section with said first fixing section to support the vibration body;
a second support section that connects said vibration section with said second fixing section to support the vibration body; and
conduction members that extend from the vibration body to said first fixing section, extend from the vibration body to said second fixing section, and supply electric power to the vibration body; and
a member that is moved by said vibration actuator,
wherein wiring shapes of said conduction members in said first support section and said second support section are approximately symmetrical about each of a first symmetry axis and a second symmetry axis which lie in one plane and mutually intersect perpendicularly and are perpendicular to a thickness direction of the vibration body.

19. The electrical apparatus according to claim 18, wherein at least part of the conduction members is not used for supplying electric power or connection to ground.

20. The electrical apparatus according to claim 18, wherein the vibration body and the contact body move relatively in a direction along which said first fixing section, said first support section, said vibration section, said second support section, and said second fixing section are aligned.

* * * * *